US012708072B2

(12) United States Patent
Koo et al.

(10) Patent No.: US 12,708,072 B2
(45) Date of Patent: Aug. 18, 2026

(54) CROP HARVESTING APPARATUS

(71) Applicant: RESEARCH & BUSINESS FOUNDATION SUNGKYUNKWAN UNIVERSITY, Suwon-si (KR)

(72) Inventors: Ja Choon Koo, Suwon-si (KR); Yeo Il Yun, Suwon-si (KR); Eun Jeong Song, Suwon-si (KR); Moo Heon Lee, Suwon-si (KR); Seon Il Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 402 days.

(21) Appl. No.: 18/459,639

(22) Filed: Sep. 1, 2023

(65) Prior Publication Data

US 2024/0074351 A1 Mar. 7, 2024

(30) Foreign Application Priority Data

Sep. 2, 2022 (KR) ........................ 10-2022-0111728

(51) Int. Cl.
*A01D 46/00* (2006.01)

(52) U.S. Cl.
CPC .................................... *A01D 46/00* (2013.01)

(58) Field of Classification Search
CPC ...... A01D 46/00; A01D 46/24; A01D 46/253; A01D 46/30
See application file for complete search history.

(56) References Cited

U.S. PATENT DOCUMENTS

| | | | | |
|---|---|---|---|---|
| 3,888,003 A * | 6/1975 | Brown | .................... | B25B 7/126 92/37 |
| 4,707,918 A * | 11/1987 | Smith | .................. | A01D 46/253 30/228 |
| 6,324,712 B1 * | 12/2001 | Elsener, Sr. | ............. | B25F 1/003 7/129 |
| 11,006,563 B2 * | 5/2021 | Bassett | .................. | A01B 63/32 |
| 2020/0375111 A1 | 12/2020 | Avigad | | |
| 2023/0122435 A1 * | 4/2023 | Jackson | .................. | E04F 10/10 52/64 |

FOREIGN PATENT DOCUMENTS

| | | |
|---|---|---|
| JP | 11-131824 A | 5/1999 |
| KR | 10-0494672 B1 | 6/2005 |
| KR | 10-2394097 | 5/2022 |

OTHER PUBLICATIONS

Korean Office Action issued on Dec. 17, 2024, in counterpart Korean Patent Application No. 10-2022-0111728 (6 pages in English, 6 pages in Korean).

* cited by examiner

*Primary Examiner* — Michael McCullough
(74) *Attorney, Agent, or Firm* — NSIP Law

(57) ABSTRACT

A crop harvesting apparatus includes a pressure generator configured to generate a pressure, a driver configured to have a shape that changes in response to receiving the pressure from the pressure generator, and a cutter configured to cut an object to be cut in accordance with a change in the shape of the driver.

9 Claims, 11 Drawing Sheets

CROP HARVESTING APPARATUS

CROSS-REFERENCE TO RELATED APPLICATION(S)

This application claims priority to and the benefit of Korean Patent Application No. 10-2022-0111728, filed on Sep. 2, 2022, the disclosure of which is incorporated herein by reference in its entirety.

BACKGROUND

1. Field

The present disclosure relates to a crop harvesting apparatus, and more particularly, to a crop harvesting apparatus capable of cutting the stem or the like of a crop using a fluid pressure.

2. Description of Related Art

Generally, crop cultivation process automation is the ultimate goal in the field of smart farms, and crop harvesting automation is one technology considered as essential to achieve the goal. In order to achieve such harvesting automation, it is necessary to use a mechanism that allows the stem or the like of a plant to be stably cut. Conventionally, as means of the mechanism, a motor-driven method, a cable-driven method, or a method using a hydraulic/pneumatic cylinder have been used. However, in the conventional methods, for reasons such as stable power transmission, highly rigid components are used in most cases, and thus there are problems in that the operation is not stable in irregular conditions such as crop harvesting, and the crops may be damaged.

The related art of the present disclosure is disclosed in Korean Patent Registration No. 10-2394097 (Date of Registration: Apr. 29, 2022, Title of Disclosure: Crop stem cutting device for tractor traction).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure is directed to providing a crop harvesting apparatus capable of cutting the stem or the like of a crop using a fluid pressure.

A crop harvesting apparatus according to the present disclosure includes: a pressure generator configured to generate a pressure; a driver configured to have a shape that changes in response to receiving the pressure from the pressure generator; and a cutter configured to cut an object to be cut in accordance with a change in the shape of the driver.

Also, the driver may include: a main body connected to the pressure generator and into which a fluid is injected; and a driving member connected to the main body and configured to contract or expand in proportion to a size of a pressure formed inside the main body.

Also, the main body may include: a chamber; an entry/exit member formed to pass through one side of the chamber and connected to the pressure generator; and a transmitter formed to pass through the other side of the chamber and connected to the driving member.

Also, the driving member may have one side connected to the main body and the other side connected to the cutter to move the cutter while contracting or expanding.

Also, the driving member may be formed of a stretchable material.

Also, the driving member may be provided as a pair of driving members, and the pair of driving members may be disposed at both sides of the main body.

Also, the cutter may include: a cutting body rotatably connected to the main body; a gripper configured to extend from the cutting body and grip or release the object to be cut in a rotating direction of the cutting body; and a blade provided at the gripper and configured to cut the object to be cut as the gripper grips the object to be cut.

Also, the cutting body may be provided as a pair of cutting bodies, and the pair of cutting bodies may rotate in opposite directions from each other while the driving member contracts or expands.

Also, the gripper may be formed in the shape of a hook and surround a circumferential surface of the object to be cut.

Also, the blade may extend along an inner side surface of the gripper that comes in contact with the object to be cut.

Also, the blade may cut the object to be cut as the main body moves in a state in which the gripper is gripping the object to be cut.

Also, the cutter may further include a rotation support portion provided between the cutting body and the main body and configured to rotatably support the cutting body relative to the main body.

Also, the rotation support portion may include: a rotation pin inserted into an insertion portion provided at the main body and configured to rotatably support the cutting body; and a snap ring fastened to the rotation pin and configured to prevent the rotation pin from being detached from the main body.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
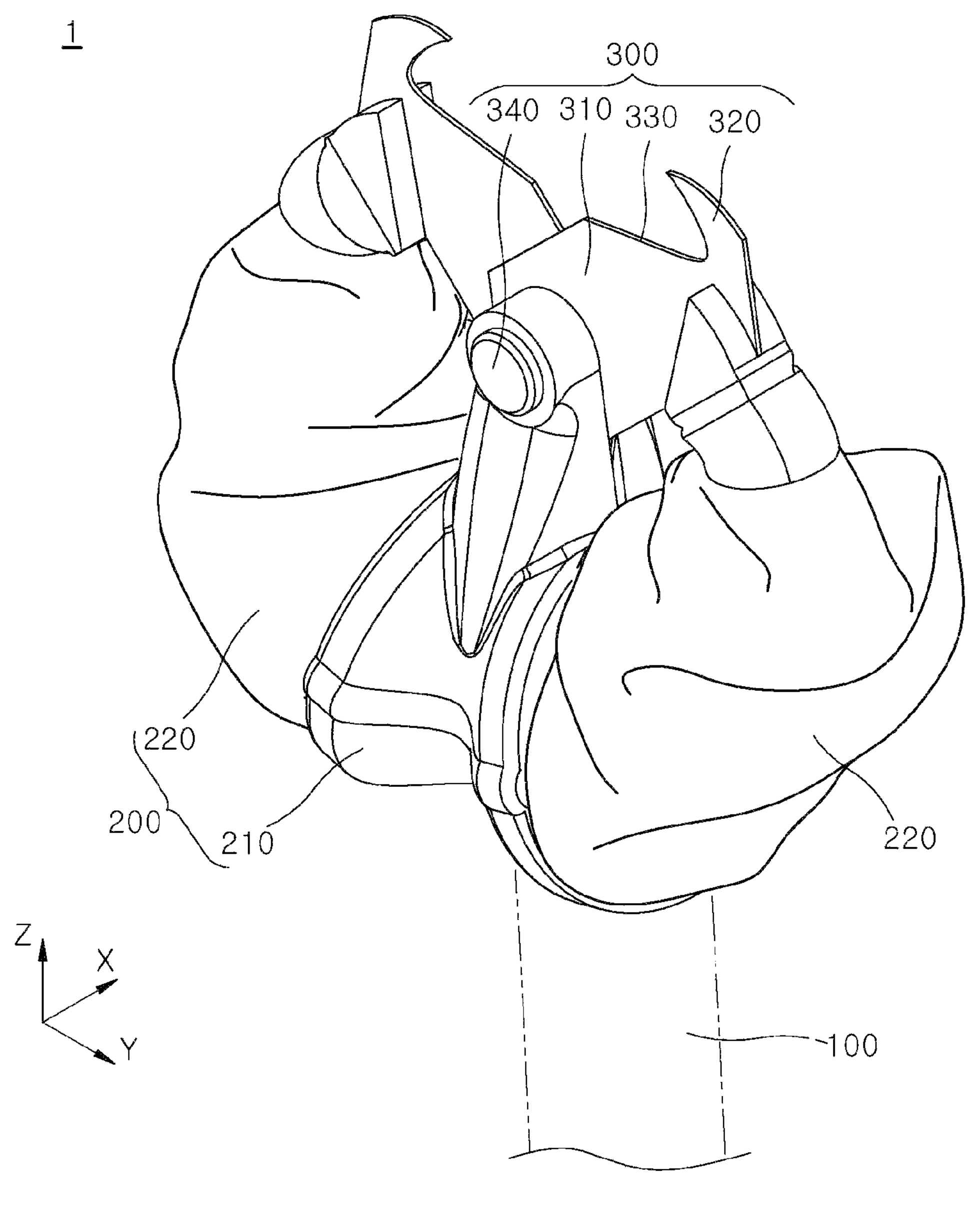
FIG. 1 is a perspective view schematically illustrating a configuration of a crop harvesting apparatus according to one embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments of a crop harvesting apparatus according to the present disclosure will be described with reference to the accompanying drawings.

Figure 2:
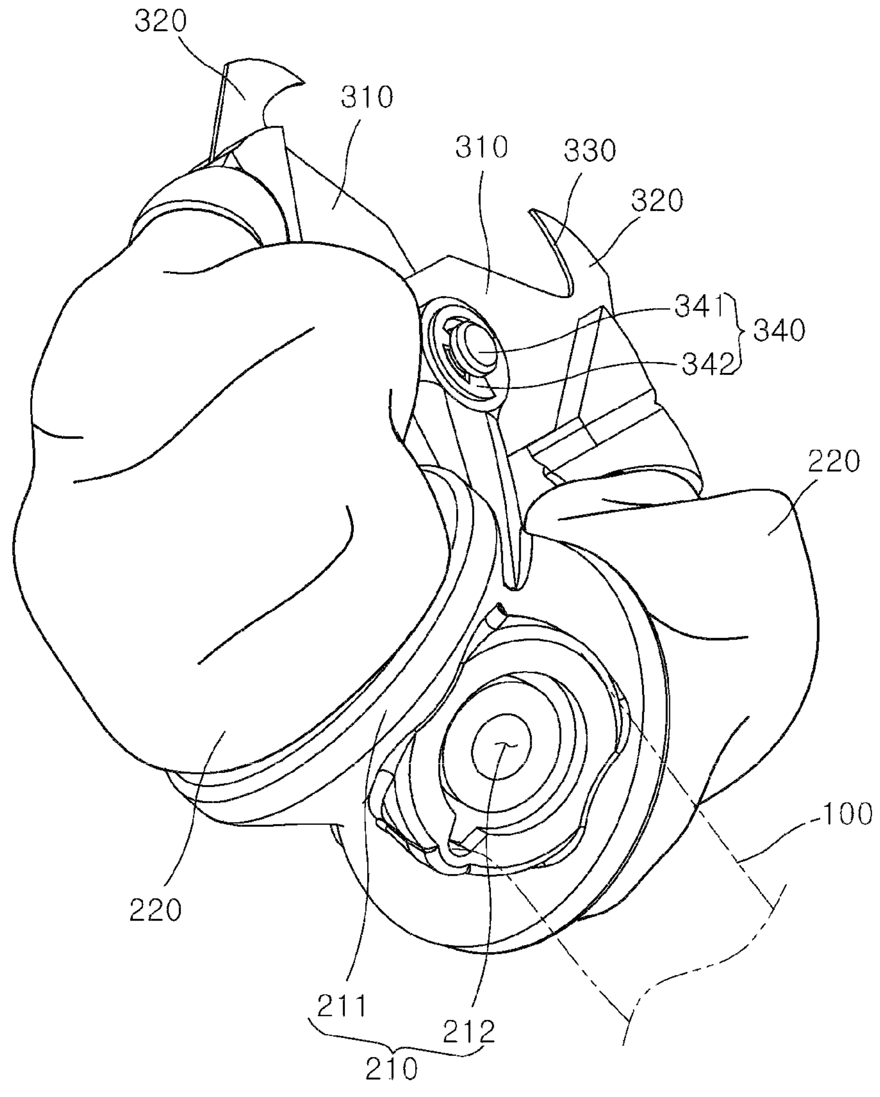
FIG. 2 is a bottom perspective view schematically illustrating the configuration of the crop harvesting apparatus according to one embodiment of the present disclosure.
Figure 3:
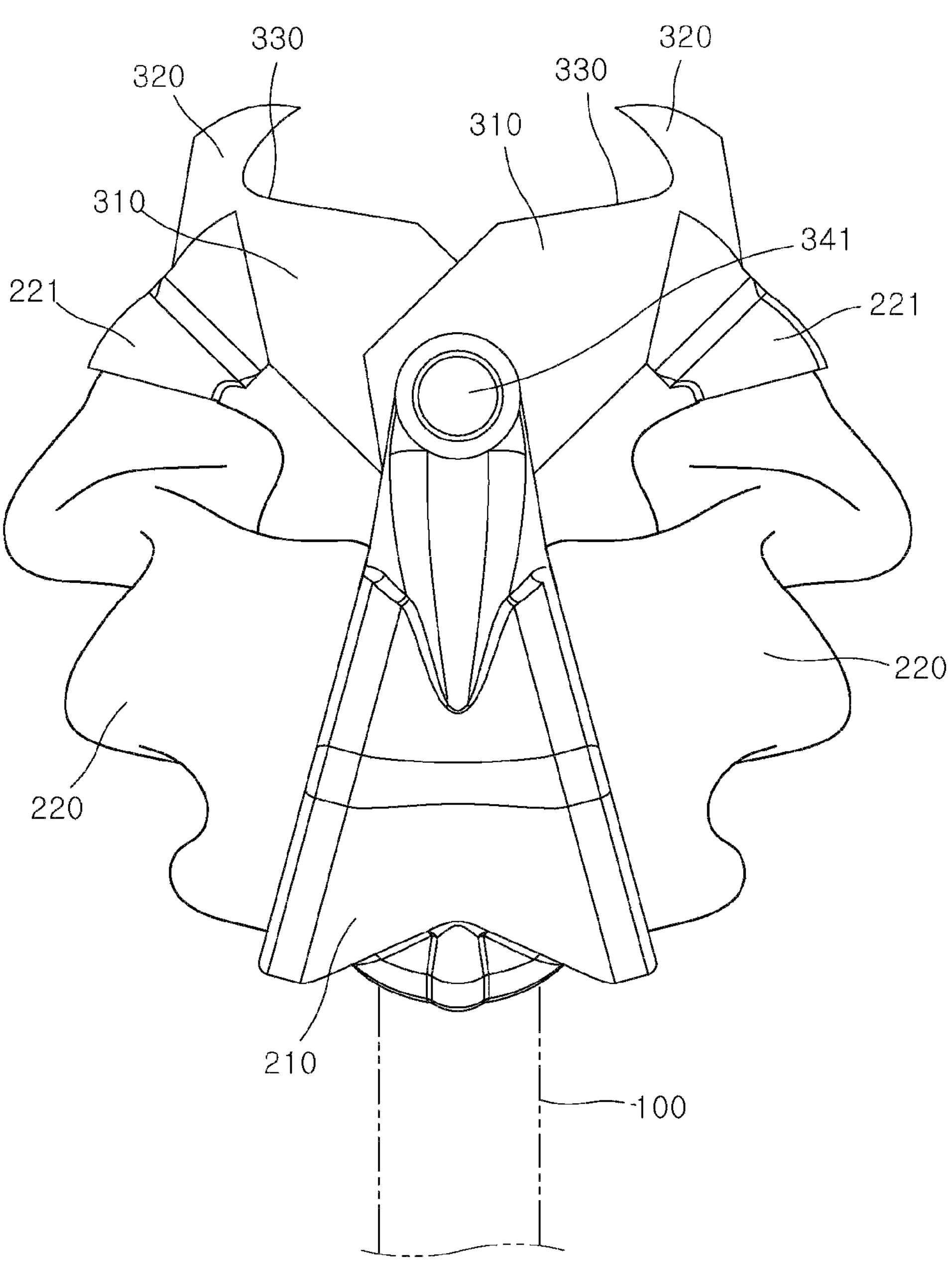
FIG. 3 is a front view schematically illustrating the configuration of the crop harvesting apparatus according to one embodiment of the present disclosure.
Figure 4:
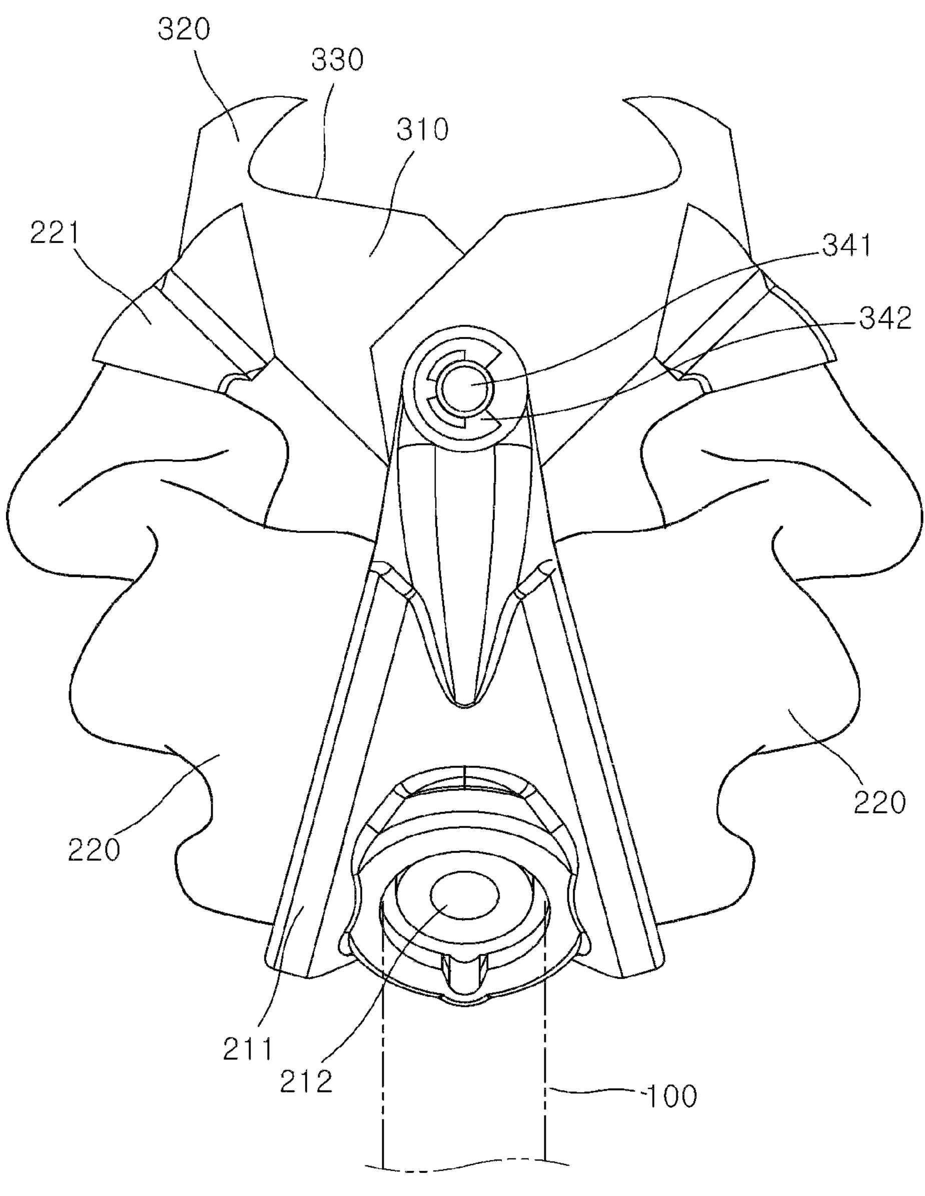
FIG. 4 is a rear view schematically illustrating the configuration of the crop harvesting apparatus according to one embodiment of the present disclosure.
Figure 5:
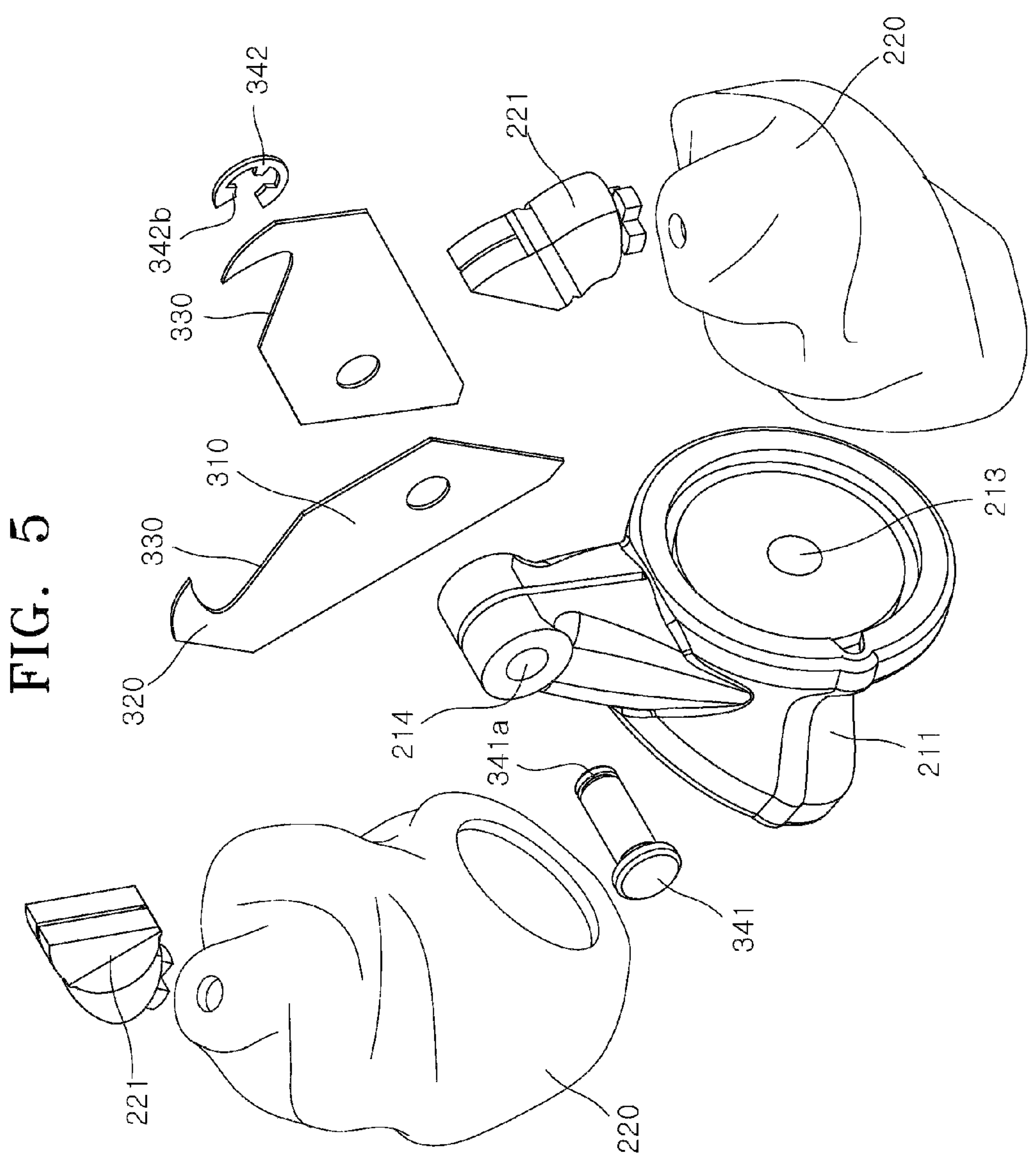
FIG. 5 is an exploded perspective view schematically illustrating the configuration of the crop harvesting apparatus according to one embodiment of the present disclosure.

FIG. 1 is a perspective view schematically illustrating a configuration of a crop harvesting apparatus 1 according to one embodiment of the present disclosure, FIG. 2 is a bottom perspective view schematically illustrating the configuration of the crop harvesting apparatus according to one embodiment of the present disclosure, FIG. 3 is a front view schematically illustrating the configuration of the crop harvesting apparatus according to one embodiment of the present disclosure, FIG. 4 is a rear view schematically illustrating the configuration of the crop harvesting apparatus according to one embodiment of the present disclosure, and FIG. 5 is an exploded perspective view schematically illustrating the configuration of the crop harvesting apparatus according to one embodiment of the present disclosure.

Referring to FIGS. 1 to 5, a crop harvesting apparatus according to one embodiment of the present disclosure includes a pressure generator 100, a driver 200, and a cutter 300.

The pressure generator 100 generates a pressure for operating the driver 200 which will be described below. Hereinafter, the case in which the pressure generator 100 generates a pneumatic pressure will be described as an example. However, the pressure generator 100 is not limited thereto and may also generate a hydraulic pressure, a water pressure, or the like. The pressure generator 100 according to one embodiment of the present disclosure may be configured by including a pneumatic pump configured to compress air suctioned through a suction port and discharge the compressed air in a high-pressure state through a discharge port and a hose connected to the pneumatic pump and configured to transfer the air discharged from the pneumatic pump to the driver 200 which will be described below.

The driver 200 has a shape changing in response to receiving a pressure from the pressure generator 100 and operates the cutter 300 which will be described below.

The driver 200 according to one embodiment of the present disclosure includes a main body 210 and a driving member 220.

The main body 210 is connected to the pressure generator 100, and the pressure inside the main body 210 changes as a fluid is injected thereinto. The main body 210 serves as a configuration for transmitting the pressure generated from the pressure generator 100 to the driving member 220 which will be described below. In this case, for example, the fluid injected into the main body 210 as the pressure generator 100 generates a pneumatic pressure may be air. The position of the main body 210 may be changed by the main body 210 being connected to a bar gripped by a worker or a manipulator of a robot.

Figure 6:
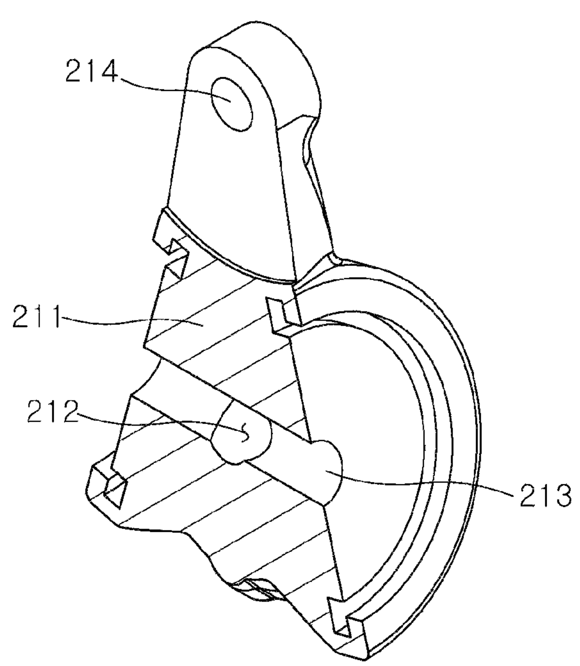
FIGS. 6 and 7 are cross-sectional perspective views schematically illustrating a configuration of a main body according to one embodiment of the present disclosure.
Figure 7:
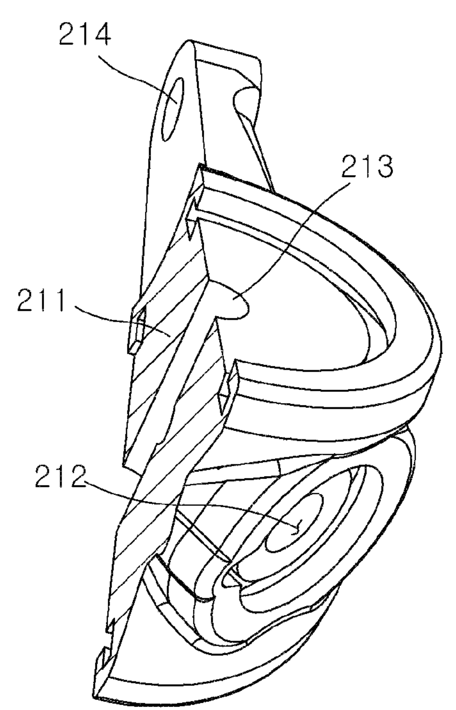

FIGS. 6 and 7 are cross-sectional perspective views schematically illustrating a configuration of a main body according to one embodiment of the present disclosure.

Referring to FIGS. 6 and 7, the main body 210 according to one embodiment of the present disclosure includes a chamber 211, an entry/exit member 212, a transmitter 213, and an insertion portion 214.

The chamber 211 forms a schematic exterior of the main body 210 and supports the driving member 220 and the cutter 300 which will be described below. The chamber 211 according to one embodiment of the present disclosure has a channel or an empty space provided therein to allow a fluid to flow. The chamber 211 may be made of a rigid body such as a metal or a synthetic resin to prevent damage caused by a pressure formed inside the chamber 211 or a load applied from the driving member 220. A specific shape of the chamber 211 is not limited to the shape illustrated in FIG. 6 and may be changed in various ways within the technical spirit of the shape that can support the driving member 220 and the cutter 300, which will be described below, as a whole.

The entry/exit member 212 is formed to pass through one side of the chamber 211 and is connected to the pressure generator 100. That is, the entry/exit member 212 serves as a configuration for guiding a flow of a fluid introduced into the chamber 211 from the pressure generator 100 or discharged to the pressure generator 100 from the chamber 211. The entry/exit member 212 according to one embodiment of the present disclosure may pass through a lower end portion of the chamber 211 and may be formed to have the shape of a hole that extends in the longitudinal direction of the chamber 211, that is, the Z-axis direction based on FIG. 1. The entry/exit member 212 has an upper end portion communicating with an inner space of the chamber 211 and a lower end portion communicating with a hose or the like of the pressure generator 100.

The transmitter 213 is formed to pass through the other side of the chamber 211 and is connected to the driving member 220 which will be described below. That is, the transmitter 213 serves as a configuration for guiding a flow of a fluid introduced into the driving member 220 from the chamber 211 or discharged to the chamber 211 from the driving member 220. The transmitter 213 according to one embodiment of the present disclosure may be formed to have the shape of a hole that passes through both left and right sides of the chamber 211 and extends in the width direction of the chamber 211, that is, the Y-axis direction based on FIG. 1. Accordingly, the entry/exit member 212 and the transmitter 213 may be disposed to intersect perpendicularly with each other inside the chamber 211. The transmitter 213 has both left and right end portions communicating with an inner space of the driving member 220 which will be described below and a central portion communicating with the upper end portion of the entry/exit member 212 via the inner space of the chamber 211.

The insertion portion 214 is provided at the chamber 211 and provides a space that allows a rotation support portion 340 of the cutter 300, which will be described below, to be installed in the chamber 211. The insertion portion 214 according to one embodiment of the present disclosure may be formed to have the shape of a hole formed to pass through an upper end portion of the chamber 211. The longitudinal direction of the insertion portion 214 may extend in a direction perpendicular to the longitudinal direction of the entry/exit member 212 and the transmitter 213, that is, parallel to the X-axis direction based on FIG. 1.

The driving member 220 is connected to the main body 210 and contracts or expands in proportion to a size of a pressure formed inside the main body 210. The driving member 220 according to one embodiment of the present disclosure may be hollow and may be formed to have the shape of a corrugated tube whose both ends are open. The driving member 220 is provided as a pair of driving members 220, and the pair of driving members 220 are disposed at both sides of the main body 210 in the width direction. The pair of driving members 220 have one side connected to the main body 210. More specifically, the pair of driving members 220 have open one end portion fixed to both left and right sides of the chamber 211 and communicating with the transmitter 213. The pair of driving members 220 receive a fluid injected into the chamber 211 through the transmitter 213. The pair of driving members 220 contract or expand in proportion to the size of the pressure caused by the fluid received from the chamber 211. Accordingly, the driving members 220 are formed of a stretchable material such as silicone or urethane.

The driving member 220 has the other side connected to the cutter 300. More specifically, the other end portion of the driving member 220 is connected to a cutting body 310 of the cutter 300 via a connecting member 221. In this case, the other end portion of the driving member 220 may be sealed by the connecting member 221. A specific shape of the connecting member 221 is not limited to the shape illustrated in FIGS. 1 to 5 and may be changed in various ways within the technical spirit of the shape that can connect the other end portion of the driving member 220 and the cutting body 310, which will be described below, to each other. Accordingly, the driving member 220 may move the cutter 300 by contracting or expanding in proportion to the size of the pressure of the fluid received from the chamber 211.

The cutter 300 cuts an object to be cut in accordance with a change in the shape of the driver 200. Here, for example, an object to be cut may be the stem of a plant, the stalk of a fruit, or the like.

Figure 8:
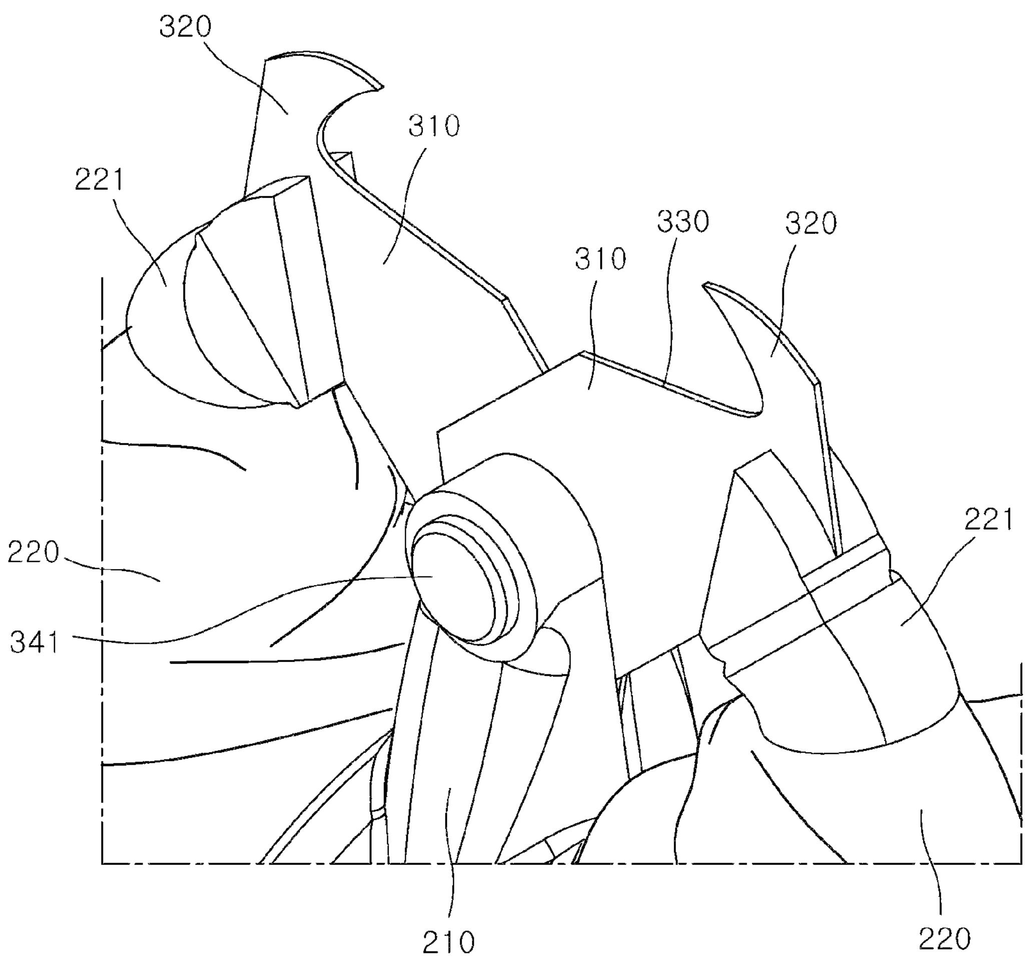
FIG. 8 is an enlarged view schematically illustrating a configuration of a cutter according to one embodiment of the present disclosure.

FIG. 8 is an enlarged view schematically illustrating a configuration of a cutter according to one embodiment of the present disclosure.

Referring to FIG. 8, the cutter 300 according to one embodiment of the present disclosure includes the cutting body 310, a gripper 320, a blade 330, and the rotation support portion 340.

The cutting body 310 forms an exterior of one side of the cutter 300 and is rotatably connected to the main body 210. The cutting body 310 according to one embodiment of the present disclosure may be formed to have a substantially flat plate shape. The cutting body 310 may have a lower end portion (based on FIG. 8) rotatably supported by an upper end portion of the main body 210 via the rotation support portion 340 which will be described below. The cutting body 310 has an outer side surface coupled to the connecting member 221 and connected to the driving member 220. The cutting body 310 rotates clockwise or counterclockwise about the upper end portion of the main body 210 while the driving member 220 contracts or expands. The cutting body 310 is formed as a pair of cutting bodies 310. The pair of cutting bodies 310 have outer side surfaces individually connected to the pair of driving members 220. A distance between inner side surfaces of the pair of cutting bodies 310 is controlled as the pair of cutting bodies 310 rotate in directions opposite from each other while the pair of driving members 220 contract or expand.

The gripper 320 extends from the cutting body 310 and grips or releases the object to be cut in a rotating direction of the cutting body 310. The gripper 320 according to one embodiment of the present disclosure may be formed to have the shape of a hook that extends to be bent from an upper end portion of the cutting body 310. The gripper 320 is provided as a pair of grippers 320, and the pair of grippers 320 extend from the pair of cutting bodies 310. The pair of grippers 320 integrally rotate with the pair of cutting bodies 310. In a state in which an object to be cut is positioned between inner side surfaces of the pair of grippers 320, the pair of grippers 320 are disposed to, by rotating in directions approaching each other, surround a circumferential surface of the object to be cut and grip the object to be cut.

The blade 330 is provided at the gripper 320 and cuts an object to be cut as the gripper 320 grips the object to be cut. The blade 330 according to one embodiment of the present disclosure may be formed to have the shape of a blade extending along an inner side surface of the gripper 320 that comes in contact with an object to be cut. The blade 330 cuts an object to be cut as the gripper 320 surrounds a circumferential surface of the object to be cut and presses an outer side surface of the object to be cut. Meanwhile, in the case in which a pressing force applied between the pair of grippers 320 is not sufficient to cut an object to be cut, the blade 330 may cut the object to be cut as the main body 210 is moved by a worker or a manipulator in a state in which the grippers 320 are gripping the object to be cut.

The rotation support portion 340 is provided between the cutting body 310 and the main body 210 and rotatably supports the cutting body 310 relative to the main body.

The rotation support portion 340 according to one embodiment of the present disclosure includes a rotation pin 341 and a snap ring 342.

The rotation pin 341 is inserted into the insertion portion 214 and rotatably supports the cutting body 310. The rotation pin 341 according to one embodiment of the present disclosure may be formed in the shape of a bar having a substantially circular cross-section. One side of the rotation pin 341 is formed to have a diameter that corresponds to a diameter of the insertion portion 214. The one side of the rotation pin 341 is inserted into the insertion portion 214 and passes through the upper end portion of the main body 210 and the lower end portion of the cutting body 310 in a direction parallel to the X-axis direction. An inner circumferential surface of the lower end portion of the cutting body 310 is supported to be rotatable about a central axis of the rotation pin 341 as an axis at an outer circumferential surface of one side of the rotation pin 341. A ring-shaped detachment prevention groove 341*a* into which an inner circumferential surface of the snap ring 342, which will be described below, may be inserted is formed on the outer circumferential surface of the one side of the rotation pin 341. The other side of the rotation pin 341 is formed to have a diameter that is larger than the diameter of the one side of the rotation pin 341 and the diameter of the insertion portion 214. An inner side surface of the other side of the rotation pin 341 comes in contact with the upper end portion of the main body 210 as the rotation pin 341 is completely inserted into the insertion portion 214.

The snap ring 342 is fastened to the rotation pin 341 and prevents the rotation pin 341 from being detached from the main body 210 in a state in which the rotation pin 341 is inserted into the insertion portion 214. The snap ring 342 according to one embodiment of the present disclosure may be formed to have the shape of a hollow ring whose circumferential portion is partially open. A plurality of detachment prevention protrusions 342*b* protrude from an inner circumferential surface of the snap ring 342 in a radial direction of the snap ring. The plurality of detachment prevention protrusions 342*b* are disposed to be spaced apart at predetermined intervals in a circumferential direction of the snap ring 342. The rotation pin 341 is inserted into the snap ring 342 through the open side of the snap ring 342. In this case, the detachment prevention protrusion 342*b* formed on the snap ring 342 is inserted into the detachment prevention groove 341*a*. Accordingly, the snap ring 342 can prevent the rotation pin 341 from moving in a direction parallel to the central axis or being detached from the main body 210 in a state in which the rotation pin 341 is inserted into the insertion portion 214.

Hereinafter, operations according to one embodiment of the present disclosure will be described in detail.

Figure 9:
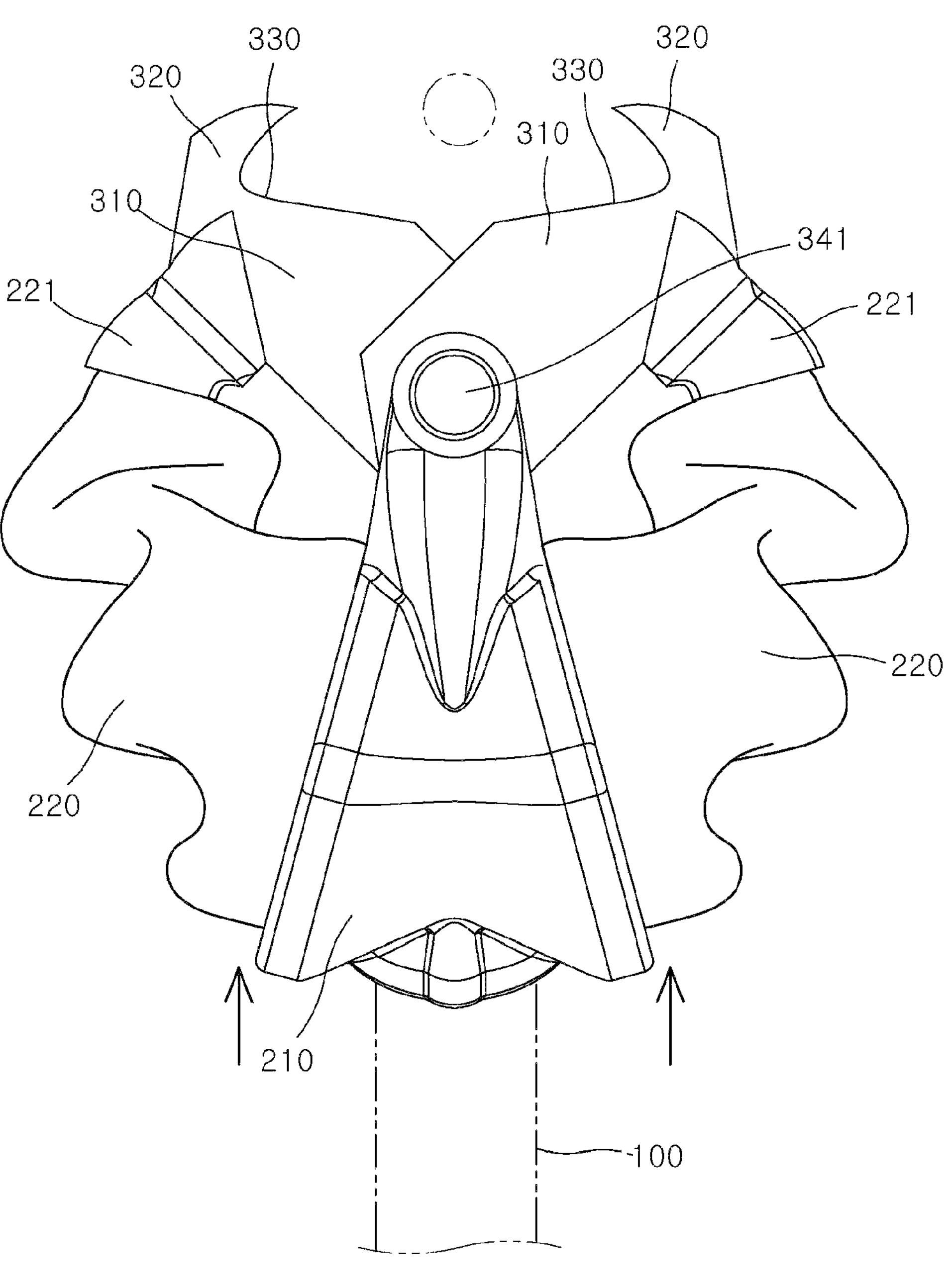
FIGS. 9, 10 and 11 are operational views schematically illustrating an operation process of the crop harvesting apparatus according to one embodiment of the present disclosure.
Figure 10:
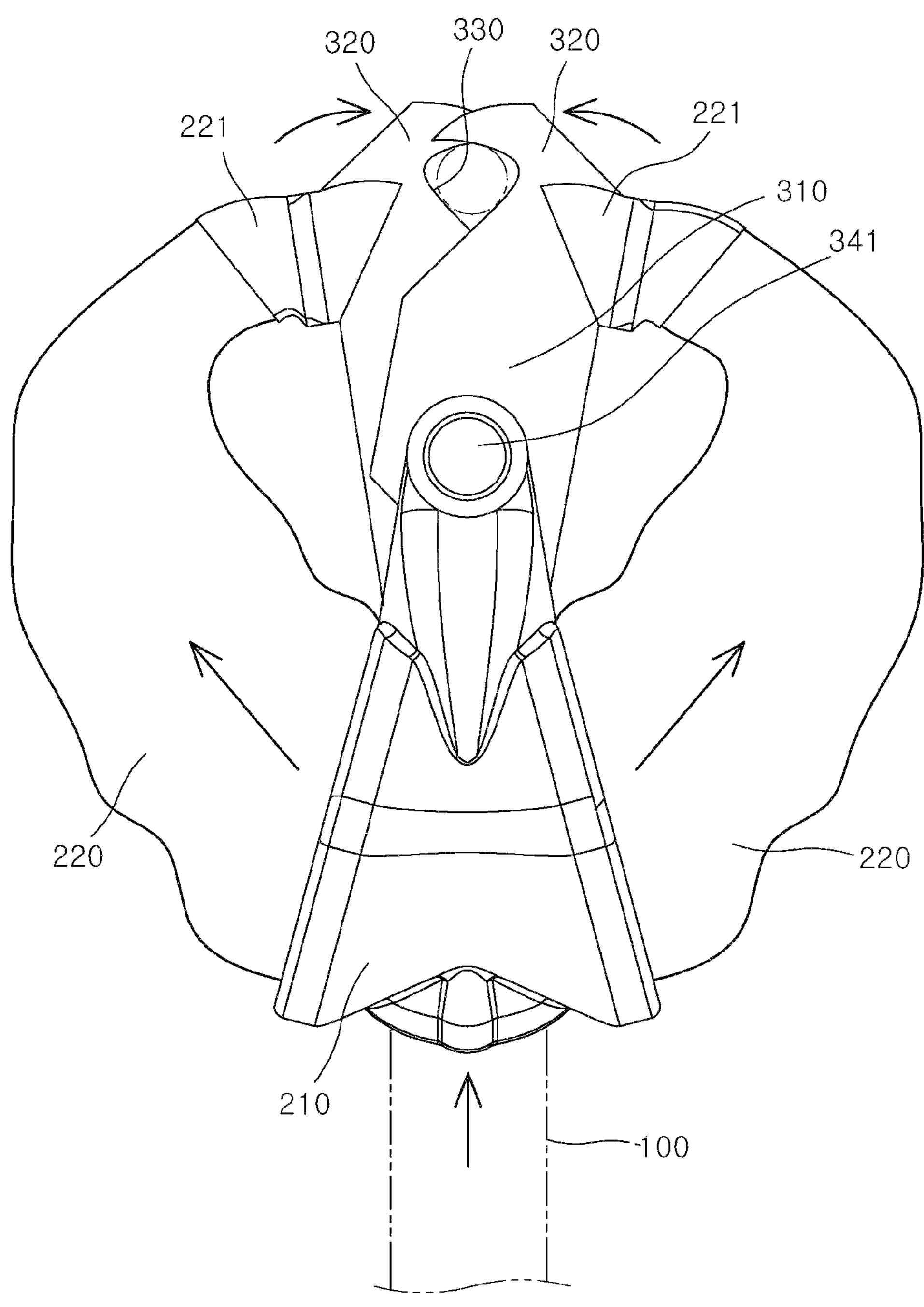
Figure 11:
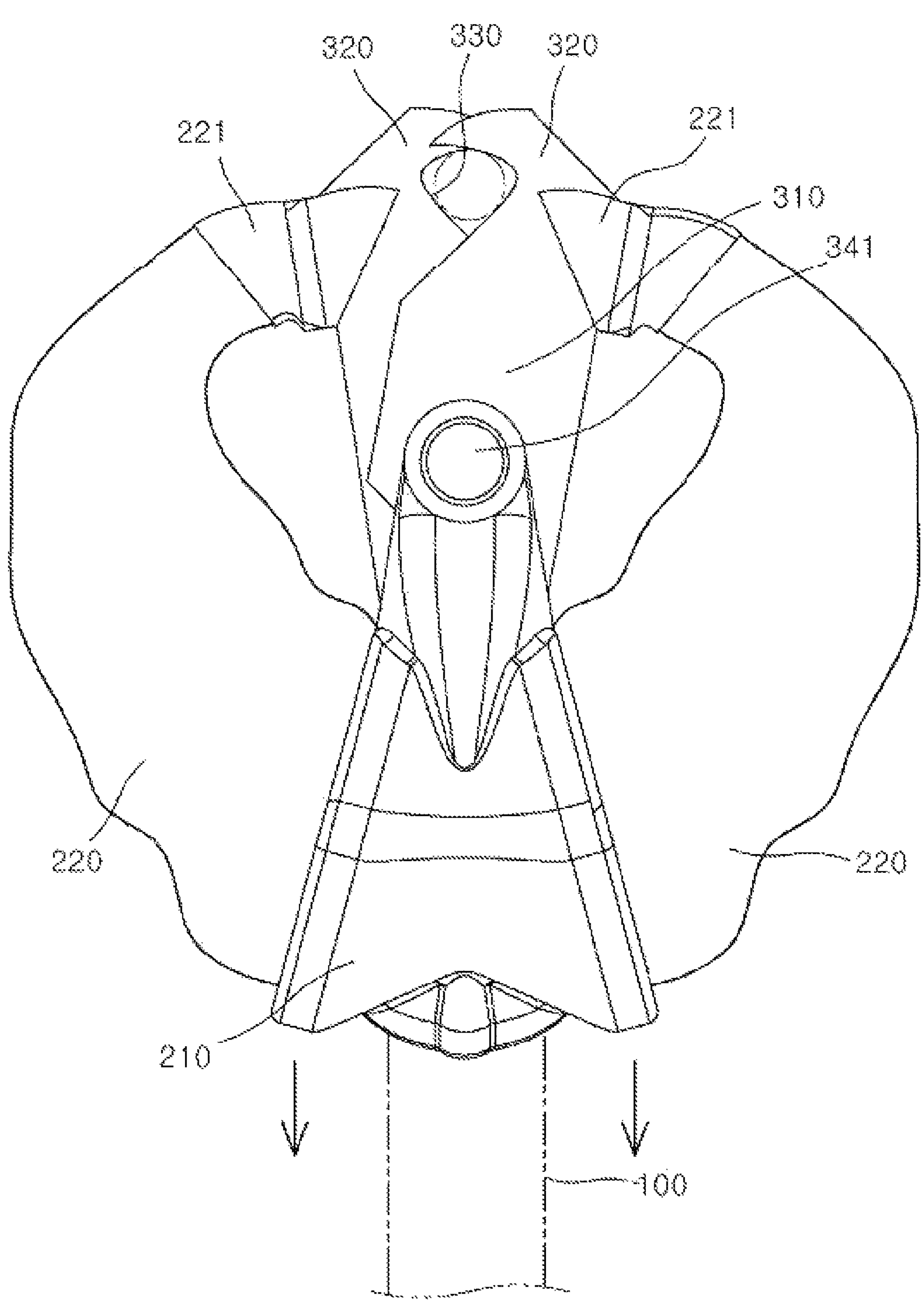

FIGS. 9 to 11 are operational views schematically illustrating an operation process of the crop harvesting apparatus according to one embodiment of the present disclosure.

Referring to FIG. 9, as a fluid inside the chamber 211 is discharged to the pressure generator 100, the driving member 220 is contracted, and the pair of grippers 320 remain spread apart.

In the above state, the main body 210 is moved by a worker manipulating a bar or by an operation of a manipulator and causes an object to be cut to be positioned between the pair of grippers 320.

Referring to FIG. 10, the pressure generator 100 generates pressure and injects a fluid into the chamber 211 through the entry/exit member 212.

The fluid injected into the chamber 211 through the entry/exit member 212 increases an internal pressure of the chamber 211 and is introduced into the driving member 220 through the transmitter 213.

The driving member 220 expands in accordance with an increase in the internal pressure of the chamber 211, and the pair of grippers 320 rotate in directions approaching each other.

As the pair of grippers 320 rotate a predetermined angle or more, the pair of grippers 320 press an outer side surface of an object to be cut and grip the object to be cut, and the blade 330 cuts the object to be cut using a pressing force of the grippers 320.

Referring to FIG. 11, in the case in which a pressing force applied by the pair of grippers 320 to the object to be cut is not sufficient and the object to be cut is not cut by the blade 330, the main body 210 is moved in the longitudinal direction, that is, a direction parallel to the Z-axis direction, by a worker manipulating a bar or by an operation of a manipulator.

As a moving force due to the main body 210 is added to the pressing force due to the grippers 320, a greater force acts between the object to be cut and the blade 330, and due to an increase in the cutting force, the blade 330 can cut the object to be cut.

By using a driving member having a freely changeable shape, a crop harvesting apparatus according to the present disclosure can secure consistent cutting performance regardless of the position, arrangement state, or the like of an object to be cut.

Also, by a gripper gripping an object to be cut and guiding a blade to cut the object to be cut always at a consistent angle, the crop harvesting apparatus according to the present disclosure can improve efficiency of a cutting task.

The present disclosure has been described above with reference to the embodiments illustrated in the drawings, but the description is merely illustrative, and those of ordinary skill in the art should understand that various modifications and other equivalent embodiments are possible therefrom.

Therefore, the technical protection scope of the present disclosure should be defined by the claims below.

What is claimed is:

1. A crop harvesting apparatus comprising:

a pressure generator configured to generate a pressure;

a driver configured to have a shape that changes in response to receiving the pressure from the pressure generator; and a cutter configured to cut an object to be cut in accordance with a change in the shape of the driver, wherein the driver includes:

a main body connected to the pressure generator and into which a fluid is injected; and a driving member connected to the main body and configured to contract or expand in proportion to a size of a pressure formed inside the main body, wherein the cutter includes:

a cutting body rotatably connected to the main body;

a gripper configured to extend from the cutting body and grip or release the object to be cut in a rotating direction of the cutting body;

a blade provided at the gripper and configured to cut the object to be cut as the gripper grips the object to be cut; and a rotation support portion provided between the cutting body and the main body and configured to rotatably support the cutting body relative to the main body, and wherein the rotation support portion includes:

a rotation pin inserted into an insertion portion provided at the main body and configured to rotatably support the cutting body; and a snap ring fastened to the rotation pin and configured to prevent the rotation pin from being detached from the main body.

2. The crop harvesting apparatus of claim 1, wherein the main body includes:

a chamber;

an entry/exit member formed to pass through one side of the chamber and connected to the pressure generator; and a transmitter formed to pass through the other side of the chamber and connected to the driving member.

3. The crop harvesting apparatus of claim 1, wherein the driving member has one side connected to the main body and the other side connected to the cutter to move the cutter while contracting or expanding.

4. The crop harvesting apparatus of claim 1, wherein the driving member is formed of a stretchable material.

5. The crop harvesting apparatus of claim 1, wherein the driving member is provided as a pair of driving members, and the pair of driving members are disposed at both sides of the main body.

6. The crop harvesting apparatus of claim 1, wherein the cutting body is provided as a pair of cutting bodies, and the pair of cutting bodies rotate in opposite directions from each other while the driving member contracts or expands.

7. The crop harvesting apparatus of claim 1, wherein the gripper is formed in the shape of a hook and surrounds a circumferential surface of the object to be cut.

8. The crop harvesting apparatus of claim 1, wherein the blade extends along an inner side surface of the gripper that comes in contact with the object to be cut.

9. The crop harvesting apparatus of claim 1, wherein the blade cuts the object to be cut as the main body moves in a state in which the gripper is gripping the object to be cut.

* * * * *